July 19, 1938.    H. G. WEISS    2,123,871

LIGHTING ARRANGEMENT FOR SOUND REPRODUCTION

Filed Nov. 30, 1934    2 Sheets-Sheet 1

INVENTOR.
HENRY GEORGE WEISS.
BY Allen & Allen
ATTORNEYS.

July 19, 1938.  H. G. WEISS  2,123,871

LIGHTING ARRANGEMENT FOR SOUND REPRODUCTION

Filed Nov. 30, 1934  2 Sheets-Sheet 2

INVENTOR.
HENRY GEORGE WEISS.
BY *Allen & Allen*
ATTORNEYS.

Patented July 19, 1938

2,123,871

UNITED STATES PATENT OFFICE 2,123,871

LIGHTING ARRANGEMENT FOR SOUND REPRODUCTION

Henry George Weiss, Cincinnati, Ohio, assignor to The Cincinnati Time Recorder Company, Cincinnati, Ohio, a corporation of Ohio Application November 30, 1934, Serial No. 755,251

1 Claim. (Cl. 88—24)

As is well known in the art, a common way of reproducing sound from sound records on motion picture films, involves the use of a so-called lens tube mounted in the reproducing head, and a source of illumination for the lens tube, i. e. an incandescent bulb actuated by non-pulsating direct current. These bulbs have usually been mounted in the reproducing head on brackets which have provision for adjustment in two and sometimes three directions. Consequently, the time consumed in changing bulbs, after one has burned out, has been relatively great, due to the necessity of making fresh adjustments. Again, this sort of arrangement for illumination has been wasteful of light, inasmuch as only a very small portion of the sphere of illumination given out by the incandescent filament should be utilized.

It is an object of my invention to provide an illumination system which is simpler in construction and very much easier to use, and in connection with which the operation of changing bulbs does not require any time-consuming adjustments whatever, and is very rapid. It is an object of my invention to predetermine the adjustment of the lamp from the adjustment of the light transmitting means which, in the particular exemplary embodiment hereinafter to be described, is a lens tube. It is a further object of my invention to provide a lighting system in which the sphere of illumination given out by the incandescent filament is much more completely utilized, so that not only is a more intense and positive illumination provided, but also, smaller sources of illumination and sources which consume less power are rendered available.

These and other objects of my invention which will be set forth hereinafter, or will be apparent to one skilled in the art upon reading these specifications, I accomplish by that certain construction and arrangement of parts of which I shall now describe the aforesaid exemplary embodiment, it being understood that my invention is not restricted thereto, and is not limited otherwise than as expressed in the appended claim.

In the drawings which form a part of these specifications—

Figure 1:
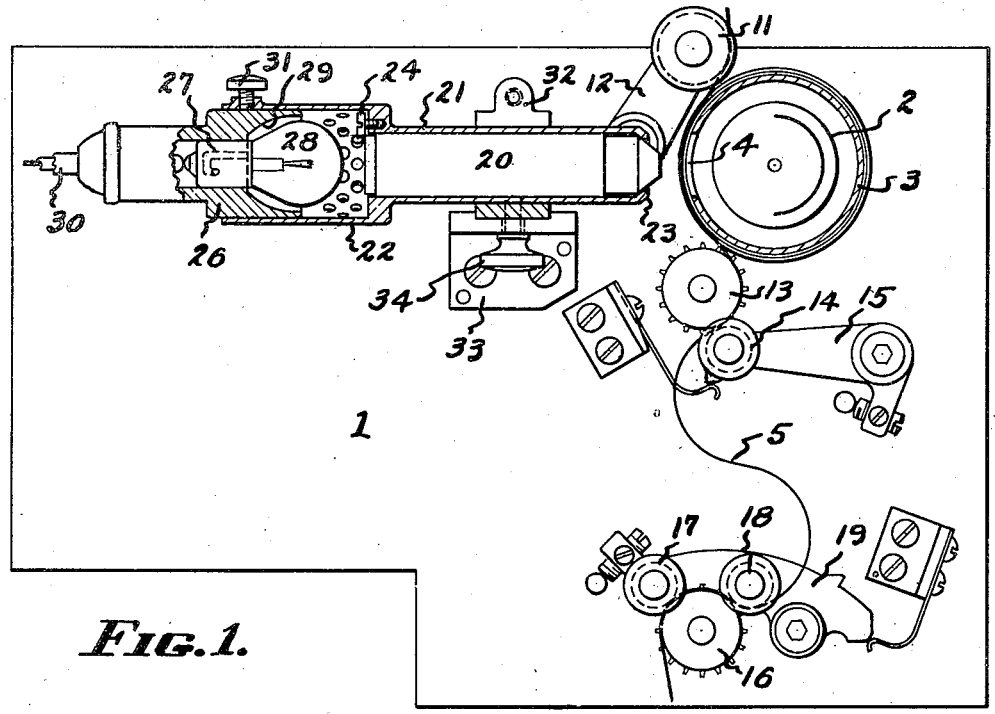
Figure 1 is an elevational view, with parts in section, of the interior mechanism of an exemplary sound reproducing head.
Figure 2:
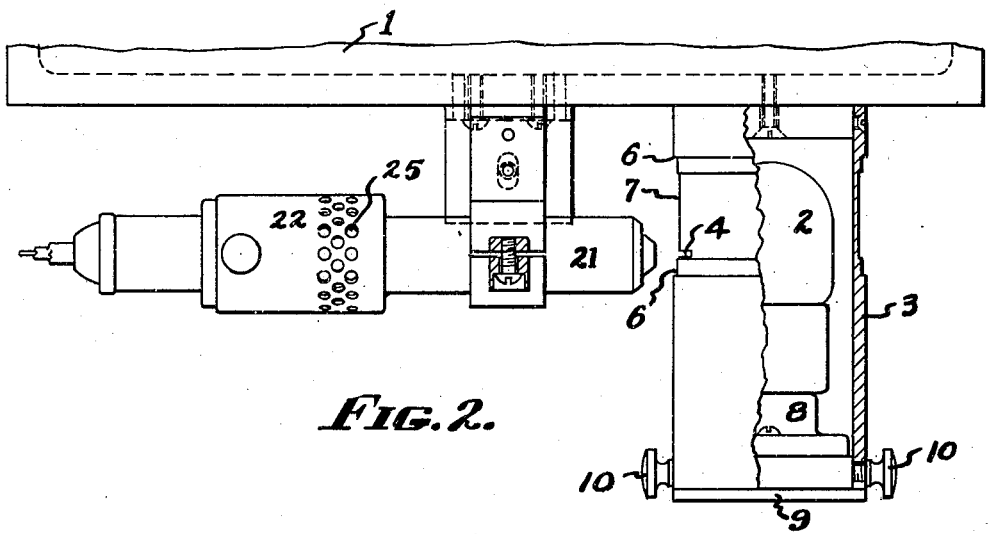
Figure 2 is a plan view thereof with parts omitted and parts in section.

In the practice of my invention, in the exemplary embodiment to which I have referred, I provide a housing which can be mounted in a fixed position in the sound head with reference to the other apparatus, as will hereinafter be described, and which has a portion not only for holding the lens tube, but also for holding a fitting which accepts the illumination bulb. This housing serves not only to hold the aforesaid parts in assembled relationship, but also to maintain the optical adjustment of the parts, and finally, to maintain the optical adjustment of the optical system, which these parts make up, to the film record and its associated apparatus, such as the photocell.

In the several figures like parts have been given like index numerals; and I shall now proceed to a description of the exemplary embodiment aforesaid. The sound head may comprise a base or bracket member indicated generally at 1, upon which the other parts hereinafter to be mentioned are mounted. In my exemplary embodiment the photocell 2 is mounted within a stationary cylinder 3, having an orifice 4 through which light, passing through the sound track on the film 5, may reach the photocell 2. The cylinder 3 is preferably provided with guide members 6 lying beyond the actual edges of the film so as to prevent side sway therein; and a portion of the surface of the cylinder lying therebetween is preferably recessed as at 7 to prevent wear on the image frames of the film as it is drawn about the stationary cylinder. The photocell 2 has a socket 8 mounted in this instance on a cap plate 9 of the cylinder 3, held in place by locking screws 10. Appropriate current connections for this photocell are made through the plate 9 or otherwise as desired, which, for the sake of clarity, have not been shown.

The film 5, coming from the motion picture reproduction head, is caused to pass over the surface of the cylinder 3, being held thereagainst upon one side by a roller 11 on a rocking arm 12, which may be actuated either by gravity or by a spring. On the other side of the cylinder 3 the film is engaged by a driving sprocket 13, which is driven by means not shown, in a steady manner and at the required speed. A roll 14, mounted upon an arm 15, holds the spring against the sprocket. There is a free loop in the film between the sprocket 13 and another driven sprocket 16, against which the film may be held by rolls 17 and 18 mounted upon a rocking arm 19. The rocking arms 15 and 19 may be controlled by springs as shown. The film 5 passes over the cylinder 3 in such a way that the sound track thereon covers the opening 4 in the cylinder, so that light reaching the photocell 2 must, in any event, pass through the sound track.

A lens tube 20, of known character, is employed to confine the light incident upon the sound track to a narrow line transversely thereof. I provide a housing which comprises a tubular portion 21 of a size adapted to receive the lens tube 20, and a connected tubular portion 22, preferably of a larger diameter or size. The lens tube 20 is placed in the tubular portion 21, and is retained at one end by an annular reduction 23 in the tubular portion, and at the other by a screw 24. The tubular portion 22 may be perforated for ventilation, as at 25. It is open at the end opposite the lens tube to receive a fitting 26 which contains a socket 27 for the bulb 28, and may likewise have surfaces providing a reflector 29 for the light, these surfaces preferably being plated with a highly reflective metal and polished. The fitting also contains terminal connections for the lead wire or wires 30 for supplying current to the lamp 28. The fitting may be held in the tubular portion 22 by a set-screw 31.

The housing may be held in the clamping bracket 32, slidably mounted, as shown, with respect to a second bracket 33 mounted on the frame member 1. The clamp 32 may be held in adjusted position by a thumbscrew 34.

It will be clear that once the housing which I have described is mounted in the apparatus in the proper way, all adjustments of the optical system are fixed thereby. In changing a bulb, it is only necessary to release the thumbscrew 31 and take out the fitting 26, changing the bulb and then replacing the fitting. The tubular portion 22 holds the lamp in the proper position with respect to the lens tube; but if any longitudinal adjustment of the lamp is desired, it may be effected by varying the distance to which the fitting 26 is inserted in the tubular member 22. The operation of changing the bulb therefore becomes exceedingly simple and rapid, and does not ordinarily require any variation of the adjustments at all. Moreover, due to the particular construction which I have shown, a much greater portion of the sphere of illumination of the lamp filament, including that which is reflected by the surface 29, may be utilized in affecting the photocell 2 through the sound track of the film. Whereas it has hitherto been necessary to use a lamp consuming fifty watts of current for illuminating the photocell, by my construction, in apparatus otherwise the same, I have been able to secure superior results through the use of a lamp consuming but eighteen watts of current.

Figure 3:
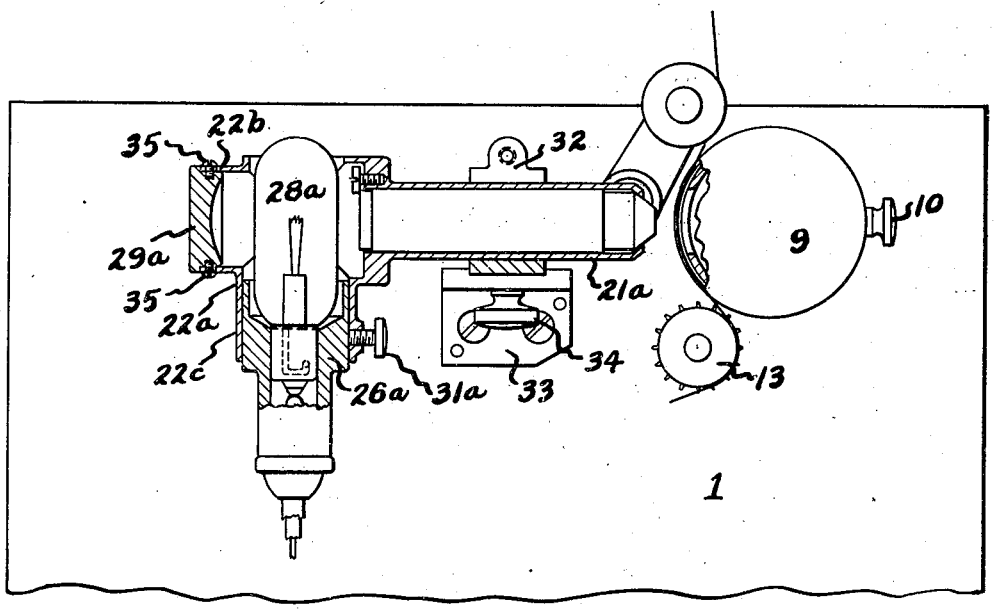
Figure 3 is a partial elevational view with sectional portions showing a somewhat different type of illumination system.

In the modification of Figure 3, the housing member 21a has connected with it an enlargement 22a, having a rearwardly extending tubular portion 22b and a transversely extending tubular portion 22c. This last mentioned tubular portion is the one which accepts the fitting 26a; but since this fitting holds the lamp 28a in an upright position, and since the lens tube is located transversely to the axis of the lamp, there is no advantage in this construction in forming the member 26a with reflecting surfaces. Rather I provide a reflector 29a connected by screws 35 to the housing extension 22b, and lying on the side of the filament opposite the lens tube. In this construction it may frequently be possible to remove the lamp 28a and replace it with another without removing any other part of the apparatus; but it is usually preferable to remove the fitting 26a, for changing bulbs, by loosening the thumbscrew 31a.

It will be understood that modifications of my invention may be made without departing from the spirit thereof.

Having thus described my invention, what I claim as new and desire to secure by Letters Patent, is:

In a sound head, a tubular housing member having a lens tube fastened in one end thereof, said member being concentrically enlarged at the other end, and having a lamp socket coaxially carried in said enlarged end, a lamp in said socket, said socket being formed to partially surround the lamp and having a reflective surface on said surrounding portion so as to act as a reflector, said socket fitting slidably and concentrically in said enlarged end, a set screw in said end for fixing the position of said socket in said end whereby replacement of said lamp will not affect the adjustment of said lamp in relation to the optical axis of said lens tube.

HENRY GEORGE WEISS.